United States Patent
Meira et al.

(10) Patent No.: US 8,714,939 B2
(45) Date of Patent: May 6, 2014

(54) PUMP HAVING AN ELECTROMAGNETIC CLUTCH SYSTEM

(75) Inventors: Joao Luiz de Carvalho Meira, Sao Paulo (BR); Eduardo Gubbiotti Ribeiro, Sao Paulo (BR); Ayres Pinto de Andrade Filho, Sao Paulo (BR); Sergio Satoshi Endo, Sao Paulo (BR)

(73) Assignee: Melling do Brasil Componentes Automotivos Ltds. (BR)

( * ) Notice: Subject to any disclaimer, the term of this patent is extended or adjusted under 35 U.S.C. 154(b) by 132 days.

(21) Appl. No.: 13/129,913

(22) PCT Filed: Nov. 18, 2008

(86) PCT No.: PCT/IB2008/003122
§ 371 (c)(1),
(2), (4) Date: Jun. 30, 2011

(87) PCT Pub. No.: WO2010/058233
PCT Pub. Date: May 27, 2010

(65) Prior Publication Data
US 2012/0020812 A1    Jan. 26, 2012

(51) Int. Cl.
| | |
|---|---|
| F04B 49/00 | (2006.01) |
| F04B 9/00 | (2006.01) |
| F04B 35/00 | (2006.01) |
| F04B 39/02 | (2006.01) |
| F04B 39/06 | (2006.01) |
| F16D 19/00 | (2006.01) |
| F16D 27/00 | (2006.01) |
| F16D 37/02 | (2006.01) |

(52) U.S. Cl.
USPC ......... 417/223; 417/319; 417/362; 192/84.31

(58) Field of Classification Search
USPC .................. 417/223, 319, 362; 192/84.31
See application file for complete search history.

(56) References Cited

U.S. PATENT DOCUMENTS

| | | | | |
|---|---|---|---|---|
| 2,530,180 | A * | 11/1950 | Russell ........................ | 192/90 |
| 4,848,531 | A * | 7/1989 | Gray et al. ................. | 192/13 R |
| 5,105,928 | A * | 4/1992 | Saeki et al. ................ | 192/84.93 |
| 6,007,303 | A * | 12/1999 | Schmidt ....................... | 417/223 |
| 6,013,003 | A * | 1/2000 | Boffelli et al. ............... | 475/149 |
| 6,394,252 | B1 * | 5/2002 | Cerny et al. ............. | 192/84.961 |
| 6,915,887 | B2 * | 7/2005 | Faller et al. .................. | 192/48.2 |
| 7,677,376 | B2 * | 3/2010 | Schachtl et al. ........... | 192/84.31 |

(Continued)

FOREIGN PATENT DOCUMENTS

| | | |
|---|---|---|
| DE | 10 2004 039 264 | 2/2006 |
| EP | 1 353 051 A2 | 10/2003 |

(Continued)

*Primary Examiner* — Bryan Lettman
*Assistant Examiner* — Lilya Pekarskaya
(74) *Attorney, Agent, or Firm* — Young Basile Hanlon & MacFarlane P.C.

(57) ABSTRACT

A water pump includes a housing, a pumping mechanism, and a pulley that receives an input torque. Rotation of a clutch disk provides a rotational force to the pumping mechanism. A ferromagnetic clutch ring rotates in unison with the pulley. The clutch ring moves between a disengaged position and an engaged position to selectively rotate the clutch disk in response to the input torque. A magnet disposed on the clutch disk attracts the clutch ring toward the engaged position, and an electromagnetic coil is operable to selectively diminish the attraction of the clutch ring to the magnet to move the clutch ring between the engaged and disengaged positions.

18 Claims, 3 Drawing Sheets

(56) References Cited

U.S. PATENT DOCUMENTS

| | | | |
|---|---|---|---|
| 8,100,239 B2 * | 1/2012 | Swanson et al. | 192/48.2 |
| 2005/0178635 A1 * | 8/2005 | Schultheiss et al. | 192/57 |
| 2006/0131120 A1 * | 6/2006 | Boffelli | 192/48.2 |
| 2007/0246322 A1 | 10/2007 | Schachtl et al. | |

FOREIGN PATENT DOCUMENTS

| | | |
|---|---|---|
| EP | 1 696 111 A2 | 8/2006 |
| GB | 1 296 833 | 11/1972 |
| JP | 56073230 | 6/1981 |

\* cited by examiner

PUMP HAVING AN ELECTROMAGNETIC CLUTCH SYSTEM

FIELD OF THE INVENTION

The invention relates to the field of pumps, and more particularly to a water pump having an electromagnetic clutch system.

BACKGROUND OF THE INVENTION

In automotive cooling systems, water pumps are used to circulate liquid coolants between an internal combustion engine and a radiator to regulate the operating temperature of the internal combustion engine of the automobile. The water pump is typically driven by the rotational output of the internal combustion engine, for example, by a belt-driven pulley that is connected to a pumping mechanism of the water pump. Because work is performed by the internal combustion engine in order to drive the pumping mechanism of the water pump, operation of the water pump increases the rate of fuel consumption by the internal combustion engine.

When the temperature of the internal combustion engine is low, continuous operation of the water pump at full speed is not required to regulate the temperature of the engine. However, the belt or other means that drives the water pump typically remains in continuous motion during operation of the internal combustion engine, causing continuous operation of the water pump at full speed, regardless of engine temperature. Thus, it would be desirable to have an efficient mechanism by which the water pump could be disengaged or operated at a reduced speed in response to the temperature of the internal combustion engine.

SUMMARY OF THE INVENTION

The invention provides a water pump having an electromagnetic clutch system. The water pump includes a housing having a pumping chamber defined therein. The pumping chamber has an inlet and an outlet. A pumping mechanism is disposed in the pumping chamber of the housing and is configured to pump a fluid from the inlet of the housing to the outlet of the housing in response to a rotational force. The water pump further includes a pulley for receiving an input torque. The rotational force is provided to the pumping mechanism in response to the input torque received by the pulley through cooperation of a clutch disk, a clutch ring, at least one magnet, and an electromagnetic coil. The clutch disk has a front side that faces the pulley and a rear side that faces the pumping mechanism, wherein an annular friction area is disposed on the front side of the clutch disk. Rotation of the clutch disk provides the rotational force to the pumping mechanism. The clutch ring is connected to the pulley for rotation in unison therewith and is fabricated at least in part from a ferromagnetic material.

The clutch ring is moveable between a disengaged position, wherein an air gap is formed between the clutch ring and the clutch disk, and an engaged position, wherein the clutch ring engages the annular friction area of the clutch disk to rotate the clutch disk in unison with the clutch ring and thereby provide the rotational force to the pumping mechanism in response to the input torque received by the pulley. The at least one magnet is disposed on the back side of the clutch disk to exert an attracting force on the clutch ring to attract the clutch ring toward the engaged position. The electromagnetic coil is operable to selectively produce an electromagnetic field that diminishes the attracting force that is exerted on the clutch ring by the at least one magnet to move the clutch ring between the engaged position and the disengaged position. The clutch ring is in the engaged position when the electromagnetic coil is de-energized, and the clutch ring is in the disengaged position when the electromagnet coil is energized.

The at least one magnet may be disposed on the clutch ring directly opposite the annular friction area. Furthermore, the at least one magnet may be disposed adjacent to the electromagnetic coil.

The water pump may include a biasing element that exerts a biasing force on the clutch ring to bias the clutch ring toward the disengaged position, wherein the force exerted on the clutch ring by the biasing element overcomes the force exerted on the clutch ring by the at least one magnet when the electromagnetic coil is energized. The water pump may include a bore that is defined through the housing and a drive shaft that is disposed partially within the housing. The bore of the housing extends along a drive axis and is in communication with the pumping chamber. The drive shaft also extends along the drive axis. The pumping mechanism is connected to the drive shaft for receiving the rotational force therefrom, the pulley is rotatably connected to the drive shaft for free rotation of the pulley with respect to the drive shaft, and the clutch disk is connected to the drive shaft for rotation in unison with the drive shaft. The drive shaft may have an inner and an outer end, wherein the pumping mechanism is disposed at the inner end of the drive shaft, the pulley is disposed at the outer end of the drive shaft, and the clutch disk is disposed at an intermediate location along the drive shaft.

The housing may have an annular electromagnet chamber that is defined in the housing and circumscribes the bore thereof. The electromagnet chamber has an open end, and the electromagnet coil is disposed within the electromagnet chamber. Additionally, the clutch disk may have an annular channel portion on the rear side thereof, wherein the at least one magnet is disposed within the annular channel portion of the clutch disk, and the annular channel portion extends at least partially into the annular electromagnet chamber of the housing. Furthermore, the annular channel portion may be disposed on the clutch disk directly opposite the annular friction area thereof.

The water pump may also include a first plurality of the auxiliary magnets and a second plurality of auxiliary magnets. The first plurality of auxiliary magnets are disposed on the clutch disk, and the second plurality of auxiliary magnets are disposed on the clutch ring. The first and second pluralities of auxiliary magnets remain spaced from one another as the clutch ring moves between the engaged and disengaged positions. Magnetic attraction between the first and second pluralities of auxiliary magnets causes non-uniform rotation of the clutch disk with respect to the clutch ring when the clutch disk is in the disengaged position, wherein the clutch disk rotates at a lower speed than the clutch ring.

In some embodiments of the invention, the pumping mechanism may be an impeller.

BRIEF DESCRIPTION OF THE DRAWINGS

The description herein makes reference to the accompanying drawings, wherein like-referenced numerals refer to like parts throughout several views and wherein.

DETAILED DESCRIPTION

Figure 1:
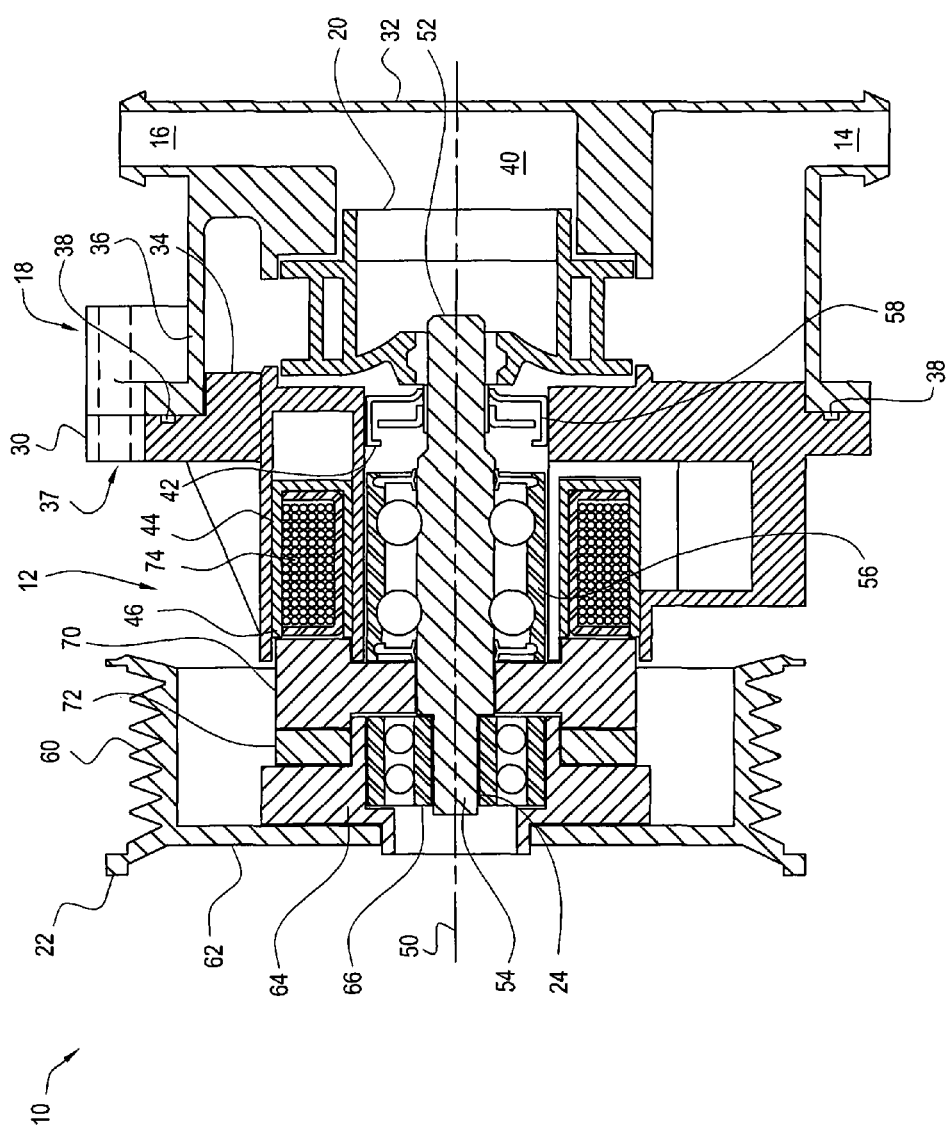
FIG. 1 is a sectional view showing a water pump according to the present invention.

FIG. 1 shows a water pump 10 according to the present invention having an electromagnetic clutch system 12. The water pump 10 is operable to pump fluid, such as water or automotive coolant, from an inlet 14 to an outlet 16 of a housing 18 using a pumping mechanism, such as an impeller 20. The impeller 20 receives a rotational force from a pulley 22 by way of a drive shaft 24 and the electromagnetic clutch system 12. The electromagnetic clutch system 12 moves between an engaged position, wherein mechanical torque is transferred between the pulley 22 and the impeller 20, and a disengaged position, wherein mechanical torque is not transferred between the pulley 22 and the impeller 20. While the water pump 10 is described as including an impeller 20, it should be recognized that the present invention is not limited to an impeller 20, but rather, the impeller 20 could be any pumping mechanism that is operable to pump fluid in response to the application of a rotational force.

The water pump 10 of the present invention is well suited to use in the cooling system of an internal combustion engine of an automobile (not shown) to pump automotive coolant to the internal combustion engine (not shown) in order to reduce the temperature of the internal combustion engine, wherein the internal combustion engine provides the rotational force to drive the pulley 22 of the water pump 10. Because torque is not transferred to the impeller 20 when the electromagnetic clutch system 12 is in the disengaged position, the electromagnetic clutch system 12 may be used to reduce the load placed on the internal combustion engine by the water pump 10 when it is not necessary to pump fluid using the water pump 10, such as when the temperature of the internal combustion engine is below a predetermined threshold temperature. However, it should be understood that the present invention is not limited to having the water pump 10 used in conjunction with internal combustion engines, but rather, the water pump 10 may be utilized in any application where selective operation of the water pump 10 is desired.

The housing 18 of the water pump 10 may be fabricated as a two-part assembly that includes a first portion 30 and a second portion 32 that cooperate to define a pumping chamber 40 within the housing 18. The first portion 30 of the housing is connected to the second portion 32 of the housing 18 by suitable fasteners 37, and the first portion 30 is sealed with respect to the second portion 32 by an elastic sealing means, such as an O-ring 38 or other suitable sealing means that is in sealing contact with an end wall 34 of the first portion 30 of the housing 18, which faces the pumping chamber 40, as well as a peripheral wall 36 of the second portion 32 of the housing 18, which circumscribes the pumping chamber 40.

To allow the drive shaft 24 to extend into the pumping chamber 40 of the housing 18, the first portion 30 of the housing 18 includes a bore 42 that extends axially therethrough. The bore 42 extends perpendicularly through the end wall 34 of the first portion 30 of the housing 18 and is in communication with the pumping chamber 40. Opposite the end wall 34 of the first portion 30 of the housing 18, an annular electromagnet chamber 44 is defined in the first portion 30 of the housing 18. The electromagnet chamber 44 is disposed outward from and coaxial with the bore 42 of the first portion 30 of the housing and has an open end 46 that faces toward the pulley 22.

To allow fluid flow into and out of the pumping chamber 40, the inlet 14 and the outlet 16 of the water pump 10 are formed in the second portion 32 of the housing 18. Both the inlet 14 and the outlet 16 are in fluid communication with the pumping chamber 40. The impeller 20 is disposed within the pumping chamber 40 adjacent to the bore 42 and separates the inlet 14 from the outlet 16 in that fluid must pass through the impeller 20 in order to travel from the inlet 14 to the outlet 16.

In order to provide a rotational force to the impeller 20, the drive shaft 24 extends through the bore 42 of the first portion 30 of the housing 18 along a drive shaft axis 50. The drive shaft 24 is substantially cylindrical and extends from an inner end 52 that is disposed within the pumping chamber 40 of the housing 18 to an outer end 54 that is disposed on the exterior of the housing 18. The inner end 52 of the drive shaft 24 is rigidly connected to the impeller 20 to cause simultaneous rotation of the impeller 20 with the rotation of the drive shaft 24. The drive shaft 24 extends axially through a bearing pack 56 that is disposed within the bore 42 of the first portion 30 of the housing 18 to support the drive shaft 24 with respect to the housing 18 and allow free rotation of the drive shaft 24 with respect to the housing 18. The drive shaft 24 also extends through a sealing assembly 58. The sealing assembly 58 is positioned within the bore 42 of the first portion 30 of the housing 18 adjacent to the end wall 34 thereof. The sealing assembly 58 includes one or more resilient sealing members that sealingly engage both the first portion 30 of the housing 18 and the drive shaft 24 while allowing free rotation of the drive shaft 24 with respect to the sealing assembly 58 to prevent fluid from entering the bore 42 from the pumping chamber 40.

In order to receive an input torque, the pulley 22 is disposed on the drive shaft 24 at the outer end 54 thereof. In particular, the pulley 22 is a substantially cylindrical member having an outer radial face 60 that is engageable with a belt (not shown) or other torque transfer means which is driven by an internal combustion engine (not shown). The outer radial face 60 of the pulley 22 may include grooves, notches, or other structures that enhance the frictional engagement of the belt with respect to the pulley 22, which thereby prevents slipping of the belt relative to the pulley 22. An axial end wall 62 of the pulley 22 extends radially inward from the outer radial face 60 of the pulley 22, and the pulley 22 further includes a hub 64 that is connected to the axial end wall 62 of the pulley 22 on an inner surface thereof. The hub 64 is rigidly connected to the axial end wall 62 of the pulley 22 and serves to rotatably connect the pulley 22 to the outer end 54 of the drive shaft 24 using a bearing 66 or other suitable means. Accordingly, when the electromagnetic clutch system 12 is in the disengaged position, the pulley 22 can rotate freely with respect to the drive shaft 24.

Figure 2:
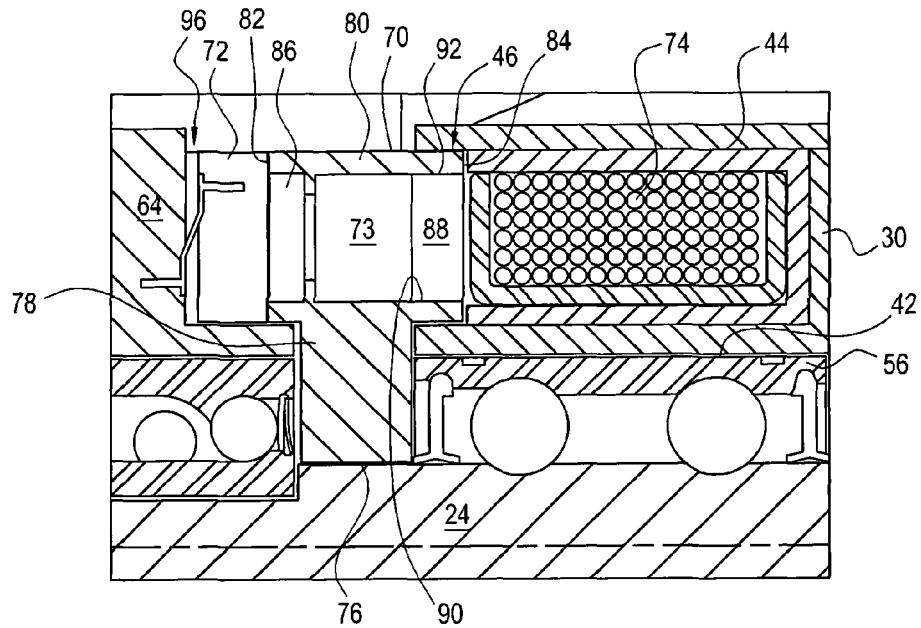
FIG. 2 is a detail view showing an electromagnetic clutch of the water pump in a disengaged position.
Figure 3:
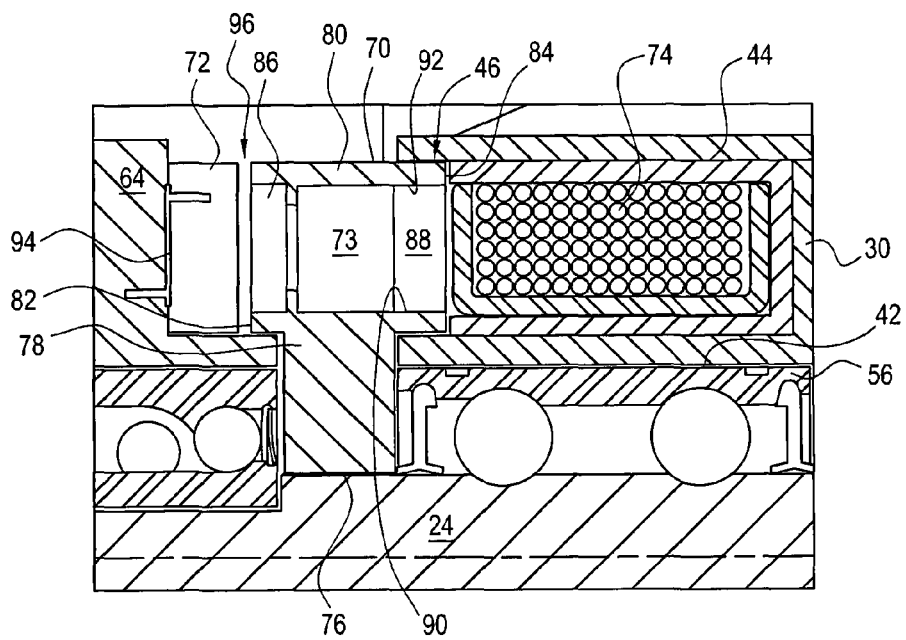
FIG. 3 is a detail view showing the electromagnetic clutch of the water pump in an engaged position.

In order to selectively and mechanically connect the pulley 22 and the impeller 20 to cause rotation of the impeller 20 simultaneously with the rotation of the pulley 22, the electromagnetic clutch system 12 includes a clutch disk 70, a clutch ring 72, one or more magnets 73, and an electromagnetic coil 74, as seen in FIGS. 2-3. As will be explained in detail herein, engagement and disengagement of the clutch ring 72 with respect to the clutch disk 70 moves the electromagnetic clutch system 12 between the engaged position, which is shown in FIG. 2, and the disengaged position, which is shown in FIG. 3.

The clutch disk 70 is rigidly connected to the drive shaft 24 at an intermediate point between the inner end 52 and the outer end 54 of the drive shaft 24. The rigid connection between the clutch disk 70 and the drive shaft 24 may be accomplished by a press fit between the drive shaft 24 and a central bore 76 of the clutch disk 70 or other suitable means to provide rotation in unison of the clutch disk 70 and the drive shaft 24.

The clutch disk 70 includes an inner portion 78 that is adjacent to the central bore 76 of the clutch disk 70 and a widened outer portion 80 that circumscribes the inner portion 78 and extends axially forward and rearward from the inner portion 78. The clutch disk further includes a front side 82 that faces toward the pulley 22 and a rear side 84 that faces toward the impeller 20.

To provide frictional engagement between the clutch disk 70 and the clutch ring 72, an annular friction member 86 is provided on the clutch disk 70. The annular friction member 86 is disposed on the outer portion 80 of the clutch disk 70 at the front side 82 thereof. The annular friction member may be formed from any suitable material and may be formed integrally with the clutch disk 70, attached to the front side 82 of the clutch disk 70 by suitable fasteners, or inset into the front side 82 of the clutch disk 70.

In order to mount the magnets 73 with respect to the clutch disk 70, an annular channel 88 may be provided on the clutch disk 70. The annular channel 88 is open toward the rear side 84 of the clutch disk 70 and faces the electromagnet chamber 44 of the housing 18. The annular channel 88 is defined between a first radial wall 90 and a second radial wall 92 of the outer portion 80 of the clutch disk 70. The first radial wall 90 is adjacent to the inner portion 78 of the clutch disk 70, while the second radial wall 92 is disposed on the outer periphery of the clutch disk 70. Both the first radial wall 90 and the second radial wall 92 of the annular channel 88 extend slightly into the electromagnet chamber 44 of the housing 18. The magnets 73 may be disposed in the annular channel 88 at spaced locations.

So that the clutch ring 72 may move between the engaged position and the disengaged position, the clutch ring 72 is connected to the hub 64 of the pulley 22 by an annular wave spring 94. The wave spring 94 fixes the clutch ring 72 with respect to the pulley 22 for uniform rotation of the clutch ring 72 and the pulley 22. However, the wave spring 94 allows axial movement of the clutch ring 72 along the drive shaft axis 50. The wave spring 94 biases the clutch ring 72 toward the hub 64 such that an air gap 96 is formed between the clutch ring 72 and the clutch disk 70 when the clutch ring 72 is in the disengaged position. So that the clutch ring 72 may move axially in response to the magnetic force generated by the magnet 73 and the electromagnetic coil 74, the clutch ring 72 is fabricated at least in part from a ferromagnetic material.

In order to attract the clutch ring 72 into engagement with the annular friction member 86 of the clutch disk 70, the magnets 73 produce a magnetic field that exerts an attracting force on the clutch ring 72. The attracting force normally exerted on the clutch ring 72 by the magnets 73 is sufficient in magnitude to overcome the biasing force exerted on the clutch ring 72 by the wave spring 94. The attracting force exerted on the clutch ring 72 by the magnets 73 is further sufficient in magnitude to allow the annular friction member 86 to establish a non-slipping engagement between the clutch disk 70 and the clutch ring 72 when the clutch ring 72 is in the engaged position, thus providing torque transfer from the pulley 22 to the drive shaft 24 and thereby rotate the impeller 20.

The electromagnetic coil 74 is disposed within the electromagnet chamber 44 and is directly adjacent to the magnets 73, since the annular channel 88 of the clutch disk 70, in which the magnets 73 are seated, extends into the open end 46 of the electromagnet chamber 44. Energization of the electromagnet coil 74, for example, with 12V DC current, is operable to produce a magnetic field. The magnetic field produced by the electromagnet coil 74 disrupts the magnetic field produced by the magnets 73, since the magnets 73 and the electromagnetic coil 74 are adjacent to and aligned with one another. Accordingly, energization of the electromagnetic coil 74 diminishes the attracting force exerted on the clutch ring 72 by the magnets 73. When the electromagnetic coil 74 is not energized, the attracting force exerted on the clutch ring 72 by the magnets 73 overcomes the biasing force of the wave spring 94 to move the clutch ring 72 into the engaged position. When the electromagnet coil 74 is energized, the attracting force exerted on the clutch ring 72 by the magnets 73 is diminished, such that the attracting force is overcome by the biasing force of the wave spring 94, causing the clutch ring 72 to move to the disengaged position.

In operation, the water pump 10 is utilized in the cooling system of the automobile to regulate the temperature of the internal combustion engine of the automobile. An input torque is provided to the pulley 22 of the water pump 10 by the internal combustion engine. When the cooling system of the automobile determines that the temperature of the internal combustion engine is above a threshold temperature, the electromagnetic coil 74 of the electromagnetic clutch system 12 is de-energized, causing the clutch ring 72 to move to the engaged position, such that torque is transferred to the impeller 20 from the pulley 22 to pump fluid from the inlet 14 to the outlet 16 of the water pump 10. When the cooling system of the automobile determines that the temperature is below a threshold temperature, the electromagnetic coil 74 is energized, causing the clutch ring 72 to move to the disengaged position, such that torque is not transferred from the pulley 22 to the impeller 20 of the water pump 10.

Figure 4:
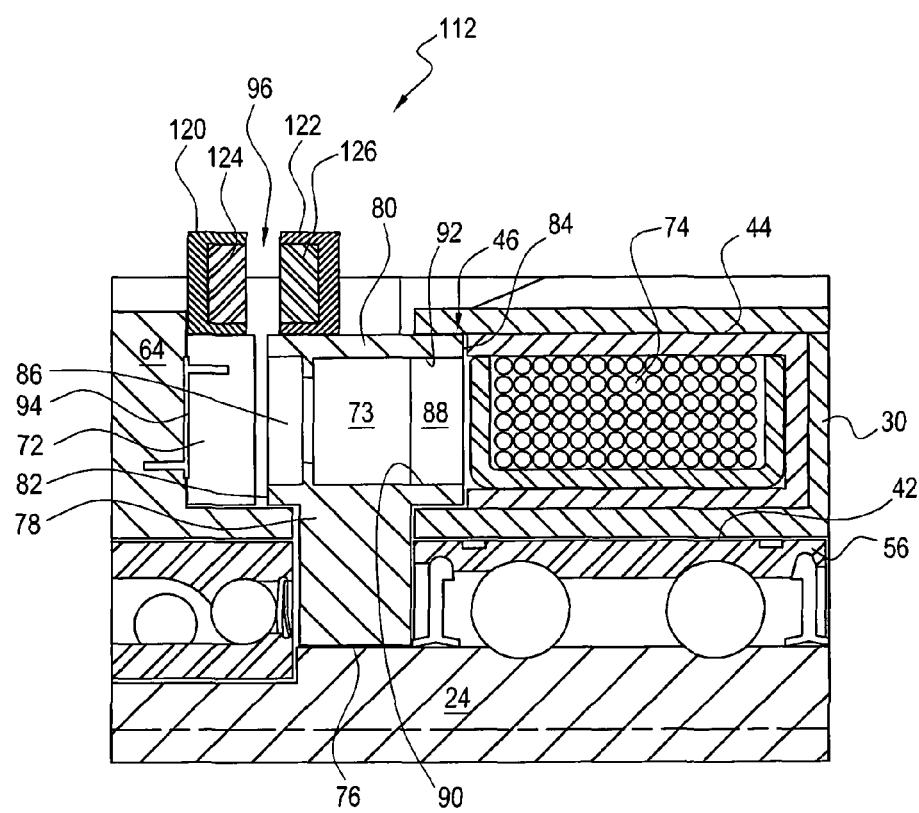
FIG. 4 is a detail view showing an alternative electromagnetic clutch.

In an alternative embodiment, the water pump 10 includes a residual motion clutch system 112, as shown in FIG. 4. The clutch system 112 includes all of the components of the electromagnetic clutch system 12, as described in connection with FIGS. 1-3. In addition, the clutch system 112 includes a first magnet carrier 120 and a second magnet carrier 122. The first magnet carrier 120 is connected to the outer periphery of the clutch ring 72 and circumscribes the clutch ring 72. The second magnet carrier 122 is connected to the outer periphery of the clutch disk 70 and circumscribes the clutch disk 70. The first magnet carrier 120 serves to position a first plurality of auxiliary magnets 124 around the periphery of the clutch ring 72, while the second magnet carrier 122 serves to position a second plurality of auxiliary magnets 126 around the periphery of the clutch disk 70. The first magnet carrier 120 and the second magnet carrier 122 are positioned so that the first and second pluralities of auxiliary magnets 124, 126 remain spaced from one another as the clutch ring 72 moves between the engaged and disengaged positions. However, when the clutch ring 72 is in the disengaged position, magnetic attraction between the first and second pluralities of auxiliary magnets 124, 126 causes non-uniform rotation of the clutch disk 70 with a respect to the clutch ring 72, such that the clutch disk 70 rotates at a lower speed than the clutch ring 72. Thus, when torque is not being mechanically transferred from the pulley 22 to the impeller 20, low speed operation of the water pump 10 may be maintained. Operation of the alternative water pump 10 having the residual motion clutch system 112 is otherwise identical to that described in connection with the embodiment shown in FIGS. 1-3.

While the invention has been described in connection with what is presently considered to be the most practical and preferred embodiment, it is to be understood that the invention is not to be limited to the disclosed embodiments, but to the contrary, it is intended to cover various modifications and equivalent arrangements included within the spirit and scope of the appended claims. The scope is to be accorded the broadest interpretation so as to encompass all such modifications and equivalent structures as is performed under the law.

The invention claimed is:

1. A water pump, comprising:
a housing having a pumping chamber defined therein wherein the pumping chamber has an inlet and an outlet;
a pumping mechanism disposed in the pumping chamber of the housing and configured to pump a fluid from the inlet to the outlet in response to a rotational force;
a pulley for receiving an input torque;
a clutch disk having a front side that faces the pulley and a rear side that faces the pumping mechanism, the clutch disk having an annular friction area on the front side thereof, wherein rotation of the clutch disk provides a rotational force to the pumping mechanism;
a clutch ring connected to the pulley for rotation simultaneously therewith, the clutch ring fabricated at least in part from a ferromagnetic material wherein the clutch ring is moveable between a disengaged position, wherein an air gap is formed between the clutch ring and the clutch disk, and an engaged position, wherein the clutch ring engages the annular friction area of the clutch disk to rotate the clutch disk in unison with the clutch ring thereby providing the rotational force to the pumping mechanism in response to the input torque received by the pulley;
a biasing element that is connected to the clutch ring and the pulley to bias the clutch ring toward the pulley to move the clutch ring toward the disengaged position;
at least one magnet disposed on the clutch disk, wherein the at least one magnet exerts an attracting force on the clutch ring to attract the clutch ring toward the engaged position; and
an electromagnetic coil operable to selectively produce an electromagnetic field that diminishes the attracting force exerted on the clutch ring by the at least one magnet to move the clutch ring between the engaged and disengaged positions, wherein the clutch ring is in the engaged position when the electromagnetic coil is de-energized, and the clutch ring is in the disengaged position when the electromagnetic coil is energized.

2. The water pump of claim 1, further comprising:
the at least one magnet is disposed on the rear side of the clutch disk such that the clutch disk is disposed between the at least one magnet and the annular friction area.

3. The water pump of claim 1, further comprising:
the at least one magnet is disposed between the electromagnetic coil and the clutch disk.

4. The water pump of claim 1, further comprising:
the housing having a bore that extends along a drive axis and is in communication with the pumping chamber;
a drive shaft that extends along the drive axis and is disposed partially within the bore of the housing;
the pumping mechanism connected to the drive shaft for receiving the rotational force therefrom;
the pulley rotatably connected to the drive shaft for free rotation of the pulley with respect to the drive shaft; and
the clutch disk connected to the drive shaft for simultaneous rotation therewith.

5. The water pump of claim 4, further comprising:
the drive shaft having an inner end and an outer end;
the pumping mechanism disposed at the inner end of the drive shaft;
the pulley disposed at the outer end of the drive shaft; and
the clutch disk disposed at an intermediate location along the drive shaft.

6. The water pump of claim 4, further comprising:
the housing having an annular electromagnet chamber defined therein that circumscribes the bore of the housing, and the electromagnet chamber having an open end, wherein the electromagnetic coil is disposed within the electromagnet chamber of the housing.

7. The water pump of claim 1, wherein the pumping mechanism is an impeller.

8. The water pump of claim 1, wherein the biasing element is a tension spring.

9. The water pump of claim 8, wherein the tension spring is an annular wave spring.

10. The water pump of claim 9, where the annular wave spring connects the clutch ring to the pulley for rotation in unison with the pulley.

11. A pump, comprising:
a pumping mechanism configured to pump a fluid in response to a rotational force;
a pulley for receiving an input torque;
a first clutch portion having a front side that faces the pulley and a rear side that faces the pumping mechanism, the first clutch portion having a friction area on the front side thereof, wherein rotation of the first clutch portion provides a rotational force to the pumping mechanism;
a second clutch portion connected to the pulley for rotation simultaneously therewith, the second clutch portion fabricated at least in part from a ferromagnetic material wherein the second clutch portion is moveable between a disengaged position, wherein an air gap is formed between the second clutch portion and the first clutch portion, and an engaged position, wherein the second clutch portion engages the friction area of the first clutch portion to rotate the first clutch portion in unison with the second clutch portion thereby providing the rotational force to the pumping mechanism in response to the input torque received by the pulley;
at least one magnet disposed on the rear side of the first clutch portion, wherein the at least one magnet exerts an attracting force on the second clutch portion to attract the second clutch portion toward the engaged position, the first clutch portion having an annular channel portion on the rear side thereof, wherein the at least one magnet is disposed within the annular channel portion; and
an electromagnetic coil operable to selectively produce an electromagnetic field that diminishes the attracting force exerted on the second clutch portion by the at least one magnet to move the second clutch portion between the engaged and disengaged positions, wherein the second clutch portion is in the engaged position when the electromagnetic coil is de-energized, and the second clutch portion is in the disengaged position when the electromagnetic coil is energized.

12. The pump of claim 11, further comprising:
the annular channel portion is disposed on the first clutch portion directly opposite the friction area.

13. The pump of claim 11, further comprising:
a housing that defines an annular electromagnet chamber having the electromagnetic coil therein, wherein the annular channel portion of the first clutch portion extends at least partially into the annular electromagnet chamber.

14. A pump, comprising:
a pumping mechanism configured to pump a fluid in response to a rotational force;
a pulley for receiving an input torque;

a first clutch portion having a front side that faces the pulley and a rear side that faces the pumping mechanism, the first clutch portion having a friction area on the front side thereof, wherein rotation of the first clutch portion provides a rotational force to the pumping mechanism;

a second clutch portion connected to the pulley for rotation simultaneously therewith, the second clutch portion fabricated at least in part from a ferromagnetic material wherein the second clutch portion is moveable between a disengaged position, wherein an air gap is formed between the second clutch portion and the first clutch portion, and an engaged position, wherein the second clutch portion engages the friction area of the first clutch portion to rotate the first clutch portion in unison with the second clutch portion thereby providing the rotational force to the pumping mechanism in response to the input torque received by the pulley;

at least one magnet disposed on the first clutch portion, wherein the at least one magnet exerts an attracting force on the second clutch portion to attract the second clutch portion toward the engaged position;

an electromagnetic coil operable to selectively produce an electromagnetic field causing movement of the second clutch portion between the engaged and disengaged positions;

a first plurality of auxiliary magnets disposed on the first clutch portion; and a second plurality of auxiliary magnets disposed on the second clutch portion, wherein magnetic attraction between the first and second pluralities of auxiliary magnets causes rotation of the first clutch portion in response to rotation of the second clutch portion at a lower speed than the second clutch portion while the second clutch portion is in the disengaged position and the first plurality of auxiliary magnets are spaced from the first plurality of auxiliary magnets.

15. A pump, comprising:

a pumping mechanism configured to pump a fluid in response to a rotational force;

a pulley for receiving an input torque;

a first clutch portion having a front side that faces the pulley and a rear side that faces the pumping mechanism, the first clutch portion having a friction area on the front side thereof, wherein rotation of the first clutch portion provides a rotational force to the pumping mechanism;

a second clutch portion connected to the pulley for rotation simultaneously therewith by an annular wave spring that is disposed between the second clutch portion and the pulley and biases the second clutch portion toward the pulley, the second clutch portion fabricated at least in part from a ferromagnetic material wherein the second clutch portion is moveable between a disengaged position, wherein an air gap is formed between the second clutch portion and the first clutch portion, and an engaged position, wherein the second clutch portion engages the friction area of the first clutch portion to rotate the first clutch portion in unison with the second clutch portion thereby providing the rotational force to the pumping mechanism in response to the input torque received by the pulley;

at least one magnet disposed on the first clutch portion to exert an attracting force on the second clutch portion to attract the second clutch portion toward the engaged position by overcoming a biasing force applied to the second clutch portion by the annular wave spring; and an electromagnetic coil operable to selectively produce an electromagnetic field causing movement of the clutch ring between the engaged and disengaged positions.

16. The pump of claim 15, wherein the at least one magnet is disposed on the rear side of the first clutch portion such that the first clutch portion is disposed between the at least one magnet and the friction area.

17. The pump of claim 15, wherein the at least one magnet is disposed between the electromagnetic coil and the first clutch portion.

18. The pump of claim 15, wherein the at least one magnet and the electromagnetic coil are separated by an air space that is free of intervening structures.

\* \* \* \* \*